United States Patent [19]

Younger

[11] 4,361,304

[45] Nov. 30, 1982

[54] EXHAUST SYSTEM HANGER

[75] Inventor: Gib Younger, Mt. Prospect, Ill.

[73] Assignee: A. Lakin & Sons, Inc., Chicago, Ill.

[21] Appl. No.: 153,085

[22] Filed: May 27, 1980

[51] Int. Cl.³ ............................................ F16M 13/00
[52] U.S. Cl. ...................................... 248/544; 248/58
[58] Field of Search ................... 180/309; 248/58, 60, 248/544, 610; 285/61, 62, 63, 64

[56] References Cited

U.S. PATENT DOCUMENTS

| 2,064,751 | 12/1936 | Hussman | 248/544 |
| 2,324,992 | 7/1943 | Riesing | 248/610 |
| 2,856,020 | 10/1958 | Hoagg et al. | 180/309 |
| 3,022,971 | 2/1962 | Cote | 248/58 |
| 3,718,305 | 2/1973 | Suozzo | 248/58 |
| 3,769,774 | 11/1973 | Barnes | 248/58 |
| 3,960,232 | 6/1976 | Hubbell | 248/58 |
| 4,079,926 | 3/1978 | Nunes | 248/610 |

FOREIGN PATENT DOCUMENTS

| 2118146 | 12/1979 | Fed. Rep. of Germany | 248/58 |
| 2346626 | 10/1977 | France | 248/610 |
| 678688 | 9/1952 | United Kingdom | 248/60 |

Primary Examiner—Dave W. Arola
Attorney, Agent, or Firm—Gary, Jeuttner & Pyle

[57] ABSTRACT

A hanger for exhaust system components wherein a loop of reinforced resilient sheet material is disposed between the exhaust system and the vehicle, and overlapping brackets from the exhaust system and the vehicle hold the resilient loop in compression. In the event of failure of the compressed loop, the brackets may interengage to provide continued support for the exhaust system.

4 Claims, 3 Drawing Figures

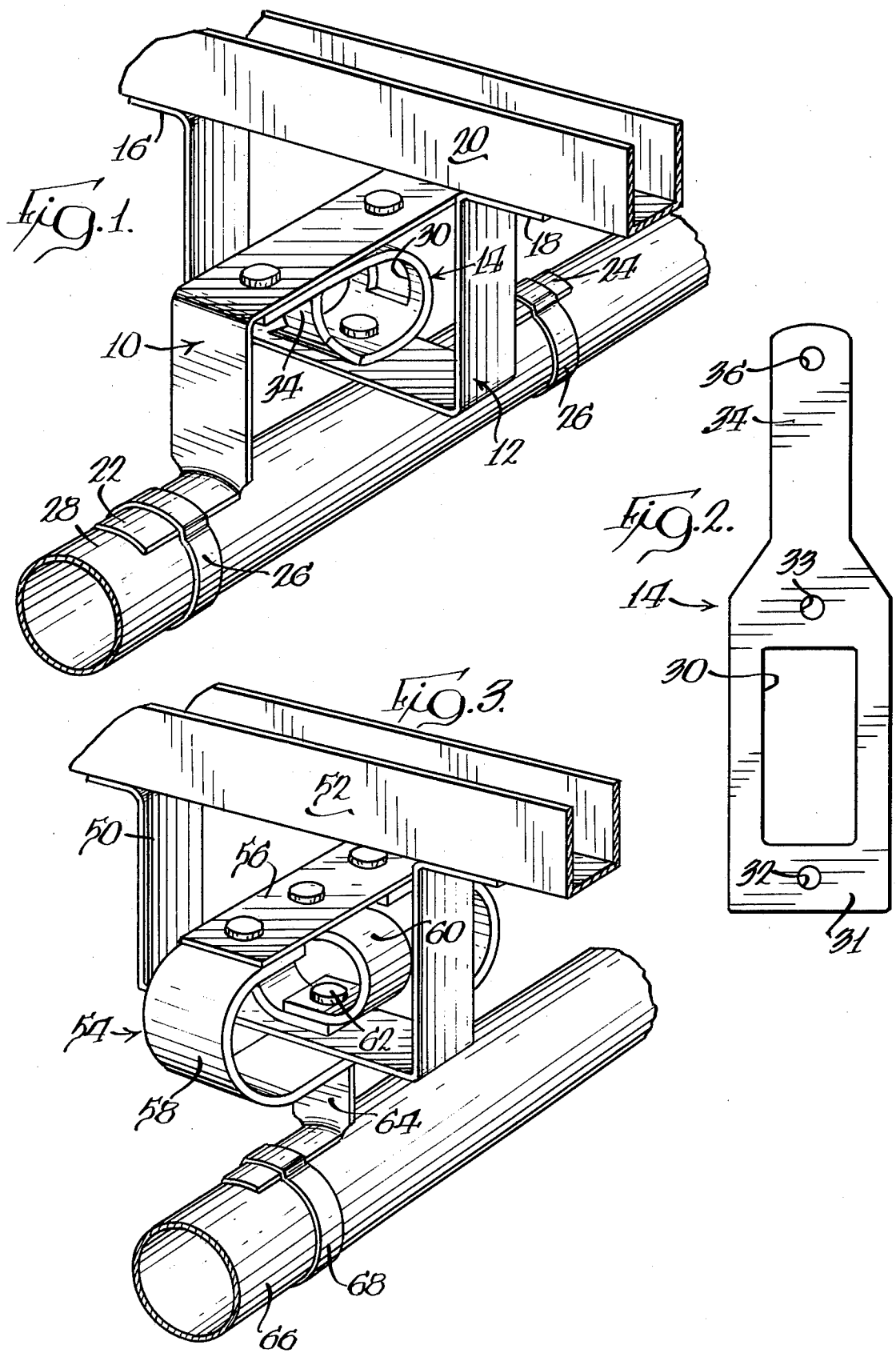

EXHAUST SYSTEM HANGER

BACKGROUND OF THE INVENTION

This invention relates to flexible or resilient hangers wherein an object is to be suspended from a support. More particularly, this invention relates to a hanger for supporting elements of an exhaust system in an automobile, truck or similar vehicle.

It is desirable and well known to provide hangers for elements of an exhaust system. Conventional hangers may include, for example, a metal bracket attached to the underbody frame of the vehicle, a second bracket attached to the tailpipe, and a piece of flexible or resilient material connected between the ends of the brackets. In the conventional design, the resilient material is placed under tension by the weight of the exhaust system suspended therefrom.

A common difficulty with conventional hangers is that the resilient element tends to fatigue or otherwise to become progressively weak to the point where the resilient element fails, allowing the exhaust system components to fall down and create a dangerous situation, which is also costly to repair.

An additional problem with conventional hangers is that the arrangement cannot adequately compensate for conditions encountered under service conditions. Exhaust systems tend to elongate when they become hot and the exhaust system may be subjected to considerable shocks and other forces. There is no provision in conventional systems to accommodate sufficiency for axial thermal expansion and contraction of the metal pipe, and the resilient member does not adequately restrain lateral movements.

Various types of exhaust and other pipe hangers may be found in the following U.S. Pat. Nos.: 2,856,020; 3,022,971; 3,718,305; 3,769,774; and 3,960,232.

SUMMARY OF THE INVENTION

The exhaust system of the present invention affords solutions to the foregoing problems and provides other advantages that will be described herein in more detail. The hanger comprises a pair of overlapping U-shaped or enclosed brackets connected respectively to the frame and the tailpipe. Connected between the U-portions of the brackets is a loop of resilient material. The arrangement places the resilient loop under compression rather than under tension, resulting in a longer service life. In addition, the arrangement is fail-safe, in that, in the event that the flexible element fails, the overlapping U-portions of the brackets come into engagement and prevent the exhaust system components from falling or hanging down. The arrangement is also more compliant, allows for thermal expansion of the pipe and allows resiliently damped movement in all directions for reduced noise.

DESCRIPTION OF THE PREFERRED EMBODIMENTS

As shown in FIG. 1, the exhaust hanger of the present invention comprises a pair of brackets having U-shaped portions, generally indicated at 10 and 12, and a flexible or resilient element, generally indicated at 14. The brackets 10 and 12 are arranged to have spaced overlapping horizontal portions, and the resilient element 14 is secured between the overlapping portions of the brackets. Although the brackets shown are U-shaped, it will be apparent that either or both of the brackets could be a partially or fully closed loop.

More specifically, one bracket 12 has a pair of flanged legs 16 and 18 that are secured by suitable means to a vehicle support beam or other suitable rigid support means 20 extending laterally across the vehicle. The other bracket 10 has a pair of flanged legs 22 and 24 secured by suitable means such as clamps 26 to the tailpipe 28 or other element of the exhaust system. Upon installation, the brackets are in an interengaged relationship, with the exhaust system bracket 10 being aligned with the axis of the pipe 28, and the vehicle frame bracket 12 being arranged perpendicular to the other. In such arrangement, medial portions or inner surfaces of the respective brackets face each other.

Various types of loops of resilient or flexible material may be employed in various forms to provide the resilient element 14. Particularly suitable materials include a loop made from a strip of fabric reinforced elastomer, similar to the material used for the manufacture of tires or expansion joints. The loop is secured by suitable fasteners between the medial facing portions of the U-brackets, as shown.

In accordance with the preferred embodiment, a multi-leg loop is employed for the member 14 and may be made from a single strip of sheet material shown in FIG. 2. As shown, one end 31 of the strip is enlarged and includes an elongate rectangular opening 30, as well as openings for fasteners, such as 32 and 33. The other end of the strip comprises a leg 34 having a width less than the width of the rectangular opening 30. As shown in FIG. 1, the free ends of the strip are then secured at spaced locations to one of the brackets 10, and the central portion of the strip is secured to the other bracket 12 as shown.

As shown in FIG. 2, the resilient element 14 is sufficiently self-supporting to support the weight of the system without flattening, and the weight of the system merely tends to compress the loop. In addition, the tailpipe 28 may move back and forth without departing or tilting from its normal axial position, such axial movement typically being caused by thermal expansion and contraction. The particular form of loop employed also allows relative movement in all directions between the pipe and support while continuing to provide resilient support therebetween.

It may also be seen that the hanger of the present invention provides a fail-safe feature due to the interengagement or overlapping state of the brackets 10 and 12. In the event the resilient element 14 should fail, portions thereof will most usually be retained by the fasteners, and in any event the facing surfaces of the brackets will come into engagement and prevent the tailpipe from dropping down.

Another version of a hanger that incorporates the compression feature is shown in FIG. 3. Here, a flanged U-shaped bracket 50 is suspended from the frame 52 in a manner similar to the previous embodiment. A continuous loop 54 is provided around the medial portion of the bracket 50 and is spaced therefrom. The loop 54 preferably includes an upper support plate 56 but otherwise may be composed of a flexible strip 58. A loop 60 of flexible material is secured between the plate 56 and the medial portion of bracket 50 by a suitable fastener 62. The lower portion of the loop 54 is attached to an L-shaped bracket 64, the free end of which is secured to the tailpipe 66 by a clamp 68. In such arrangement, the lower portion of the loop 54 is spaced from the lower portion of bracket 50.

In the foregoing version, it may be seen that the weight of the exhaust system is carried by the loop 60 under compression, and the arrangement also includes overlapping portions that may engage in the event of failure of the loop 60.

I claim:

1. A resilient hanger for suspending an elongated object from a support comprising first bracket means connected to the support, second bracket means connected to the object, said first and second bracket means having spaced overlapping portions, and resilient means between said portions whereby said object is resiliently supported, said resilient means comprising a continuous loop of flexible material connected between said overlapping portions, said loop being under compression and accommodating longitudinal movement of said object relative to said support while remaining under compression.

2. The hanger of claim 1 wherein said first and second bracket means are interengageable in the absence of said resilient means.

3. The hanger of claim 1 wherein said first and second bracket means comprise brackets having U-shaped portions arranged in an interengageable relationship.

4. A resilient hanger for supporting an elongated object from a support comprising first bracket means connected to the support, second bracket means connected to the object, said first and second bracket means having spaced overlapping portions, and resilient means between said portions whereby said object is resiliently supported, said resilient means comprising a loop of flexible strip material having an elongated opening near one end and a leg at the other end, said leg passing through said opening, with said loop being connected between said overlapping portions, said loop being under compression and accommodating longitudinal movement of said object relative to said support while remaining under compression.

* * * * *